Sept. 25, 1956  M. E. NEWHALL  2,764,402
THERMOCOUPLE MOUNTING FOR LEAD BATH
Filed Feb. 10, 1953
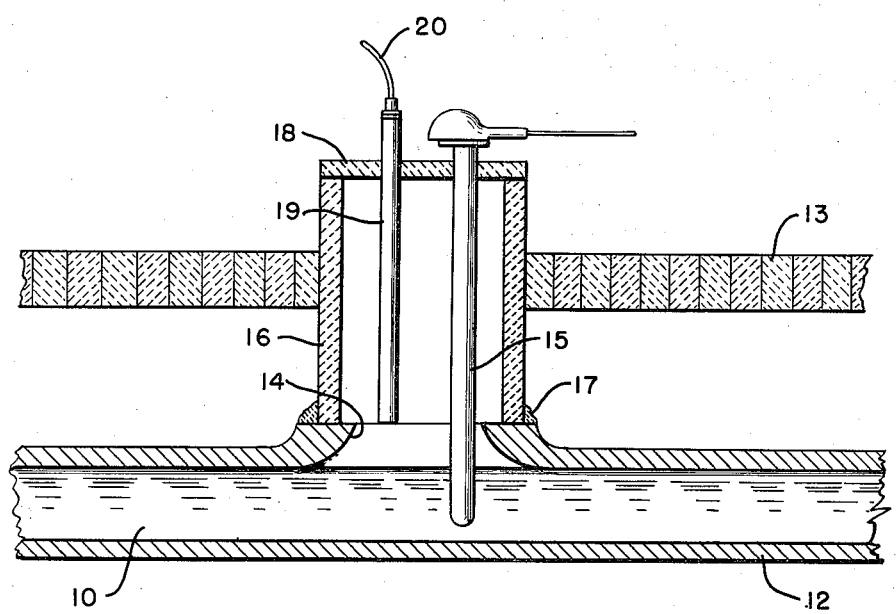
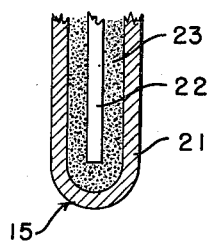
INVENTOR.
MILTON E. NEWHALL
BY
Donald G. Dalton
HIS ATTORNEY

United States Patent Office 2,764,402
Patented Sept. 25, 1956

2,764,402

THERMOCOUPLE MOUNTING FOR LEAD BATH

Milton E. Newhall, Concord, Calif.

Application February 10, 1953, Serial No. 336,138

1 Claim. (Cl. 266—1)

This invention relates to an improved mounting for thermocouples used in baths of molten metals, such as lead.

Oxide films commonly form on the surface of molten metal baths exposed to air, and in some instances these films are corrosive to bodies of other metals inserted in the bath. For example when an alloy steel thermocouple tube is inserted in a bath of molten lead, a lead oxide film on the bath surface corrodes the tube, which then fails rapidly. Ceramic or other thermocouple tubes not subject to such attack are impractical because of their poor resistance to thermal and mechanical shock.

An object of the present invention is to provide an improved mounting for thermocouples used in molten metal baths, which mounting overcomes the likelihood of attack to the thermocouple tube and thus prolongs life of the thermocouple.

A further object is to provide an improved thermocouple mounting which prevents oxides from forming on the surfaces of molten metal baths in the vicinity of the thermocouple.

A further object is to provide an improved thermocouple mounting which seals off the bath surface from the surrounding air and supplies an inert or reducing gas to this surface in the vicinity of the thermocouple, and in which the thermocouple itself is protected from deleterious effects of the gas by an oxidizing agent within the thermocouple tube.

In accomplishing these and other objects of the invention, I have provided improved details of structure, a preferred form of which is shown in the accompanying drawing, in which:

Figure 1 is a vertical sectional view through a molten lead bath equipped with a thermocouple and a mounting that embodies features of the present invention; and Figure 2 is a vertical sectional view on a larger scale of a portion of the thermocouple itself.

Figure 1 shows a portion of a molten lead bath 10 of the type used in heat treatment of wire by the process commonly known as "patenting" and to which the thermocouple mounting of the present invention is especially applicable. The bath is confined within an enclosed metal pan 12, for example of cast iron. The pan in turn is mounted within a furnace, the roof of which is indicated at 13. In a "hot lead" furnace the bath temperature is commonly 1640° F., plus or minus 25° F., and in a "cold lead" furnace 970° F., plus or minus 25° F. At such temperatures the bath surface oxidizes if exposed to air, and yet the close temperature tolerance requires that a thermocouple be inserted in the bath to maintain control. Consequently the pan 12 has an opening 14 for admission of a thermocouple 15.

In accordance with the present invention, a sleeve 16 of silicon carbide or equivalent refractory is mounted over the opening 14 and extends through the roof 13. A seal 17 of chrome ore paste or the like prevents entry of hot furnace gases to the interior of the sleeve at its contact with the pan. The sleeve has a cover 18 through which extend the thermocouple 15 and a tube 19. This tube terminates above the surface of the bath 10, and its outer end is connected to a gas line 20. The thermocouple 15 extends below the surface of the bath.

A reducing or inert gas is introduced continuously to the space within the sleeve 16 through the gas line 20 and tube 19 and is maintained at a pressure a little above atmospheric. I have found natural gas particularly well suited for this purpose. The gas prevents oxidation of the surface of the bath 10 and thus protects the thermocouple tube from the corrosive effects of an oxide film.

Figure 2 shows the thermocouple 15 on a larger scale. The thermocouple comprises an outer metal tube 21 of stainless steel or the like and a temperature sensitive element 22. I have found that thermocouple elements of the type used for measurement of high temperatures are adversely affected if exposed to a reducing gas. To protect the thermocouple element I prefer to pack an oxidizing agent 23, such as manganese dioxide powder, within the tube around the element.

From the foregoing description it is seen that the present invention affords a particularly simple and effective means for prolonging thermocouple life. For example, in a patenting furnace in the absence of the thermocouple mounting of my invention, the usual life of a thermocouple is about three days of furnace operation. My mounting increases this life to thirty days and longer. In fact the thermocouple readily outlasts the pans.

While I have shown and described only a single embodiment of the invention, it is apparent that modifications may arise. Therefore I do not wish to be limited to the disclosure set forth but only by the scope of the appended claim.

I claim:

The combination, with an enclosed metal pan adapted to contain a molten metal bath and having an opening in its top, and a thermocouple inserted through said opening, of a mounting for said thermocouple comprising an imperforate refractory sleeve mounted over said opening and having a sealed connection at its lower end with the top of said pan, a cover closing the top of said sleeve and having two openings, said thermocouple extending through one of the openings in said cover, a gas admitting tube extending through the other opening in said cover, and means for introducing reducing gas to said tube at greater than atmospheric pressure to exclude air from said sleeve, said thermocouple including an outer metal tube, a temperature sensitive element within said metal tube, and an oxidizing agent within said metal tube surrounding said element to protect it from the reducing gas.

References Cited in the file of this patent

UNITED STATES PATENTS

| 1,140,701 | Mitchell | May 25, 1915 |
| 1,784,420 | Dietert | Dec. 9, 1930 |
| 1,842,272 | Knerr | Jan. 19, 1932 |

OTHER REFERENCES

Trans. Am. Soc. for Metals, vol. 29, December 1941, pages 878 and 879.